United States Patent
Van Hoff

(10) Patent No.: US 6,226,654 B1
(45) Date of Patent: *May 1, 2001

(54) WEB DOCUMENT BASED GRAPHICAL USER INTERFACE

(75) Inventor: Arthur A. Van Hoff, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/085,498

(22) Filed: May 27, 1998

Related U.S. Application Data

(63) Continuation of application No. 08/675,271, filed on Jul. 1, 1996, now Pat. No. 5,802,530.

(51) Int. Cl.[7] .................................................... G06F 17/21
(52) U.S. Cl. ............................ 707/501; 709/219; 345/335
(58) Field of Search ..................................... 707/500, 501, 707/513; 345/302, 473, 326, 335, 348, 349; 395/200.33, 200.48, 200.79, 682, 680; 709/310, 328, 203, 218–219, 249, 217

(56) References Cited

U.S. PATENT DOCUMENTS

| | | |
|---|---|---|
| 5,347,632 | 9/1994 | Filepp et al. . |
| 5,706,502 * | 1/1998 | Foley et al. .......................... 709/328 X |
| 5,708,709 * | 1/1998 | Rose .......................................... 380/4 |
| 5,754,830 * | 5/1998 | Butts et al. ........................ 709/218 X |
| 6,009,464 * | 12/1999 | Hamilton et al. ...................... 709/219 |

OTHER PUBLICATIONS

Ken Thompson, "Regular Expression Search Algorithm," *Communications of the ACM*, Jun. 1968, vol. 11, No. 6, pp. 419–422.

Kin–Man Chung and Herbert Yuen, "A 'Tiny' Pascal Compiler; Part 1: The P–Code Interpreter," *BYTE Publications, Inc.*, Sep. 1978.

Kin–Man Chung and Herbert Yuen, "A 'Tiny' Pascal Compiler; Part 2: The P–Compiler," *BYTE Publications, Inc.*, Oct. 1978.

Gene McDaniel, "An Analysis of a Mesa Instruction Set," *Association for Computing Machinery*, May 1982.

Kenneth A. Pier, "A Retrospective on the Dorado, A High–Performance Personal Computer," *IEEE Computer Society, 10th Annual Intl. Symposium on Computer Architecture*, 1983, pp. 252–269.

James G. Mitchell, et al., "Mesa Language Manual," *Xerox Corporation, Palo Alto Research Center*.

* cited by examiner

*Primary Examiner*—Joseph H. Feild
(74) *Attorney, Agent, or Firm*—Pennie & Edmonds LLP

(57) ABSTRACT

A Web document based GUI for use on a client computer that is networked with server computers. The GUI enables a user of the client computer to initiate specific operations that are performed on the client computer and that define a particular application. The GUI comprises GUI Web documents and a Web browser. Each GUI Web document is located at the client computer or one of the server computers and comprises one or more links and one or more applets. Each link provides a link to a corresponding GUI document when selected by the user with the client computer while being displayed on the client computer. Each respective applet generates, when executed on the client computer, an interactive image that is displayed on the client computer. The user can initiate a respective operation (i.e., one of the GUI's specific operations) by acting on the interactive image with the client computer to invoke the respective applet to perform the respective operation on the client computer. The Web browser runs on the client computer and, each time a displayed link of a displayed GUI Web document has been selected by the user with the client computer, loads in, if not already loaded, and displays on the client computer the corresponding GUI Web document. The Web browser displays the corresponding GUI web document by executing each of the one or more applets of the corresponding GUI Web document and displaying on the client computer the corresponding interactive image and by displaying on the client computer the one or more links of the corresponding GUI Web document.

27 Claims, 3 Drawing Sheets

WEB DOCUMENT BASED GRAPHICAL USER INTERFACE

This is a continuation of application Ser. No. 08/675,271, filed Jul. 1, 1996, now U.S. Pat. No. 5,802,530.

The present invention relates generally to graphical user interfaces (GUIs). In particular, it pertains to a GUI comprising interactive GUI Web documents and a Web browser for loading, displaying, and editing the interactive GUI Web documents.

BACKGROUND OF THE INVENTION

GUIs are well known mechanisms by which users can interact with computer programs. A typical GUI provides windows and/or dialog boxes that enable a user to initiate an operation by the computer program on the user's computer. For example, a user of a word processing program can open a spell checking dialog box by selecting a spell checking icon from a toolbar in the word processing program's window. However, this type of GUI design suffers from several significant problems.

Specifically, programs with the type of GUI just described are provided in standard packages with specific predetermined operations. In other words, the user is not able to customize and/or extend the GUI by editing it so as to add or remove specific operations that the user desires or does not desire. Moreover, since the programs are provided in standard packages, each time an upgrade is made to the program, the user must install the upgrade on the network or computer hosting the program.

Therefore, there is a need for a graphical user interface that is editable and can be upgraded easily without user involvement. The World Wide Web (WWW), which links many of the Web server computers making up the Internet, supports these features. The Web server computers store documents identified by unique universal resource locators (URLs). Many of the documents stored at these Web server computers are written in a standard document description language called hypertext markup language (HTML). Using HTML, a designer of a Web document can create displayable hypertext links in the Web document that also identify the URLs of other Web documents. When selected, the hypertext links provide links to corresponding Web documents at other Web server computers based on the URLs they identify.

A user accesses Web documents stored on the WWW using a Web browser (a computer program designed to display HTML documents and communicate with Web servers) running on a Web client computer connected to the Internet. This is done when the user selects a displayed hypertext link within a Web document currently being viewed with the Web browser. The Web browser then issues a hypertext transfer protocol (HTTP) request for the requested Web document to the Web server computer identified by the selected hypertext link. In response, the designated Web server computer returns the requested Web document to the Web browser with the HTTP.

The standard HTML syntax of Web pages and the standard communications protocol (HTTP) supported by the WWW guarantee that any Web browser can communicate with any Web server. However, until the invention of the Java programming language and Java applets (i.e., programs written in the Java programming language that are part of a Web document), there was no way to provide platform independent programs over the Internet and the WWW.

An important feature of the Java programming language is the platform independence of Java applets written in the Java language and compiled into Java bytecode. This means that such programs can be executed on any computer having a Java virtual machine module where the Java virtual machine module interprets the Java applets for execution on the specific platform of the computer.

Another important feature of Java applets is the verifiability of their integrity by a Java virtual machine module prior to their execution. The Java virtual machine module determines whether Java applets conform to predefined stack usage and data usage restrictions to ensure that Java applets cannot overflow or underflow the virtual machine module's stack and utilize only data of known data types. As a result, Java applets cannot create object pointers and generally cannot access system resources other than those resources which the user explicitly grants it permission to use. Consequently, when Java applets are downloaded to a client computer, a Web browser that is running on the client computer and has a Java virtual machine module will be able to verify and then execute the downloaded applets.

Thus, the WWW clearly supports an environment for a GUI that is based on Web documents. However, to date, interactive GUI Web documents have not yet been created nor have Web browsers been configured with an editor to enable editing of Web documents located at remote Web server computers.

SUMMARY OF THE INVENTION

In summary, the present invention is a Web document based GUI for use on a client computer that is networked with server computers. The GUI enables a user of the client computer to initiate specific operations that are performed on the client computer and that define a particular application. The GUI comprises GUI Web documents and a Web browser.

Each GUI Web document is located at the client computer or one of the server computers and comprises one or more links and one or more applets. Each link provides a link to a corresponding GUI document when selected by the user with the client computer while being displayed on the client computer. Each respective applet generates, when executed on the client computer, an interactive image that is displayed on the client computer. The user can initiate a respective operation (i.e., one of the GUI's specific operations) by acting on the interactive image with the client computer to invoke the respective applet to perform the respective operation on the client computer.

The Web browser runs on the client computer and, each time a displayed link of a displayed GUI Web document has been selected by the user with the client computer, loads in, if not already loaded, and displays on the client computer the corresponding GUI Web document. The Web browser displays the corresponding GUI web document by executing each of the one or more applets of the corresponding GUI Web document and displaying on the client computer the corresponding interactive image and by displaying on the client computer the one or more links of the corresponding GUI Web document.

The Web browser comprises an editor that edits on the client computer certain GUI Web Documents by adding and/or removing applets and links from the certain GUI Web documents. In this way, the GUI can be customized.

The GUI Web documents are HTML Web documents. Thus, those of the GUI Web documents located at the sever computers are loaded to the client computer according to the HTTP.

Moreover, the one or more applets of each GUI Web document are written in a platform independent programming language. As a result, the Web browser includes a virtual machine module that verifies the integrity of, interprets, and then executes on the client computer the applets. In the preferred embodiment, the platform independent programming language is the Java programming language and the virtual machine module is a Java virtual machine module.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
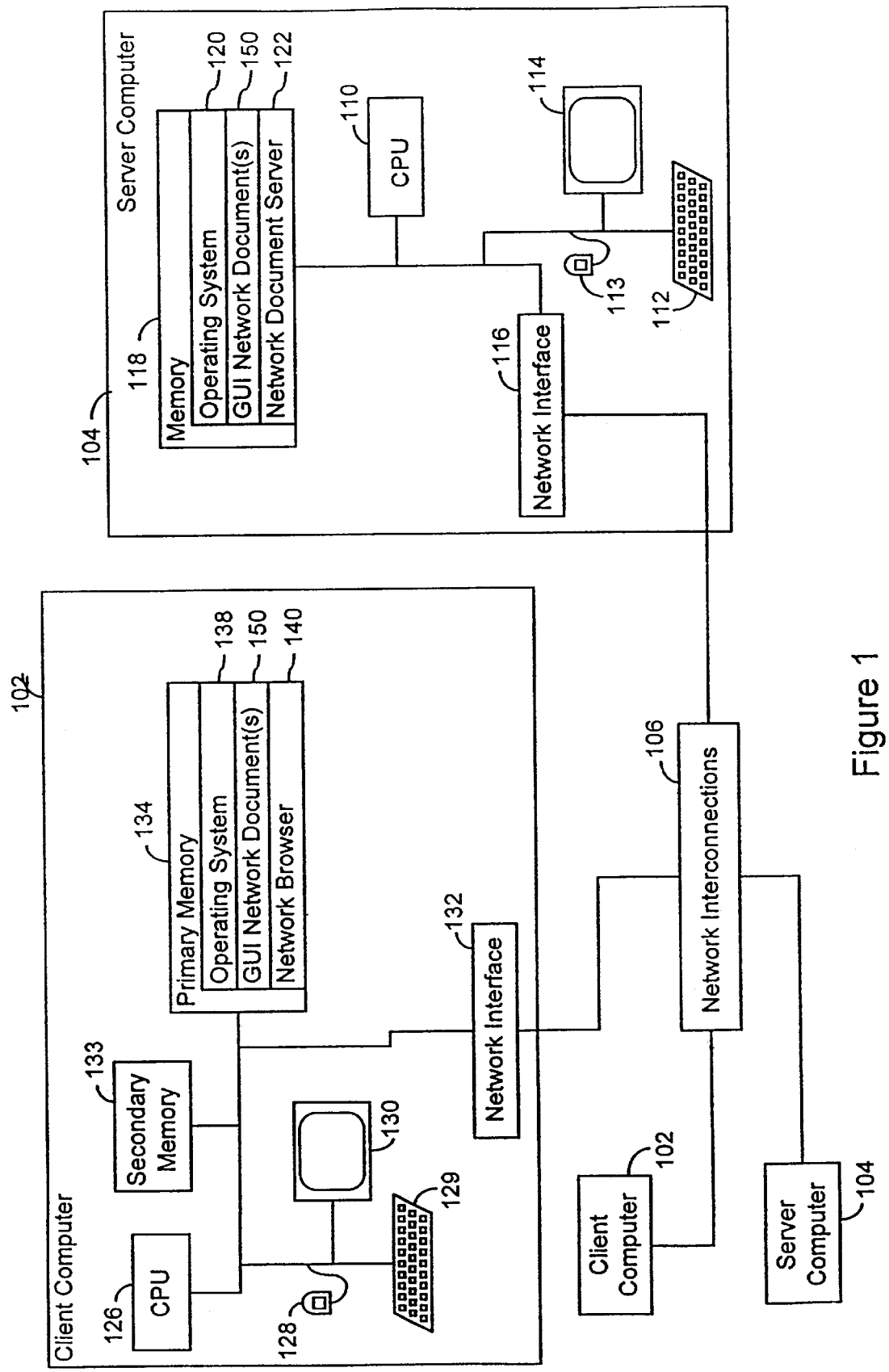
FIG. 1 is a block diagram of a computer network providing a Web document based GUI in accordance with the present invention.

Referring to FIG. 1, there is shown a computer network 100 providing a Web document based GUI in accordance with the present invention. It includes one or more client computers 102, one or more server computers 104, and network interconnections 106.

The client computers 102 are connected to the server computers 104 via the network interconnections 106. The network interconnections may be a local or wide area network, the Internet, or some other types of network interconnections.

Each server computer 104 includes a central processing unit (CPU) 110, user input devices 112 and 113, a display 114, a network interface 116, and a memory 118. The network interface enables each server computer to communicate with the client computers 102 via the network interconnections 106.

The memory 118 of each server computer 104 stores an operating system 120, a Web server 122, and Web documents 150. The operating system and Web server are run on the CPU 110. The operating system controls and coordinates running of the Web server. This may be in response to commands issued by a user with the user input devices 112 and 113 in setting up the Web server to download the Web documents. And, it may be in response to requests received by the network interface 116 via the network interconnections 106 from users of the client computers 102 for downloading the Web documents to the client computers. In the preferred embodiment, the Web documents are HTML Web documents and the Web server is an HTTP server for downloading the HTML documents according to the HTTP.

Each client computer 102 includes a central processing unit (CPU) 126, user input devices comprising a mouse 128 and a keyboard 129, a display 130, a network interface 132, a secondary memory 133, and a primary memory 134. The network interface enables the client computer to communicate with the server computers 104 via the network interconnections 106.

The primary memory 134 of each client computer system 102 stores an operating system 138 and a Web browser 140 which may be both loaded from the secondary memory 133. Alternatively, they may be downloaded loaded from one of the server computers 104 via the network interconnections 106. The primary memory also stores the Web documents 150 that have been either downloaded from the server computers 104 and/or loaded from the secondary memory. The operating system and Web browser are executed on the CPU 126. The operating system controls and coordinates execution of the Web browser in response to commands issued by a user with the mouse 128 and/or keyboard 129 for downloading the Web documents 150 from the sever computers and/or loading them from the secondary memory. In the preferred embodiment, the Web browser is a HotJava (a trademark of Sun Microsystems) Web browser or Java compatible Web browser that includes a Java virtual machine module.

The GUI Web documents 150 and the Web browser 140 together comprise a set of computer-readable modules that are suitable for transmission over the network interconnections 106 and form a unique and novel Web document based GUI that is supported by the network 100. The GUI enables the user of a client computer 102 to initiate specific operations on the client computer that define a particular application, such as a word processing application for editing a word processing document.

Figure 2:
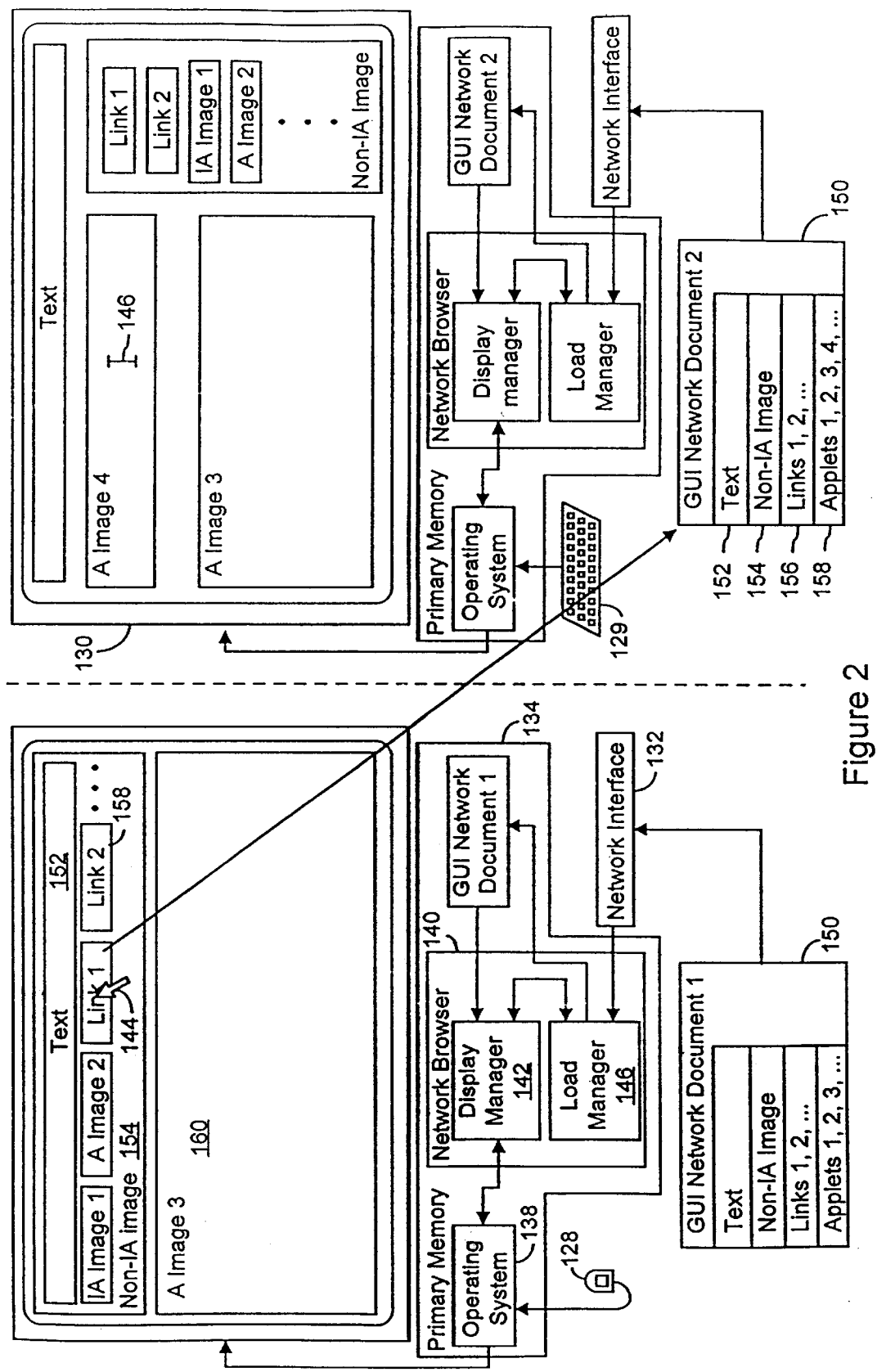
FIG. 2 is a functional block diagram of the operation of the Web document based GUI.

Specifically, referring to FIG. 2, each GUI Web document 150 can be displayed on the display 130 by the display manager 142 of the Web browser 140 via the display driver (not shown) of the operating system 138. Also displayed on the display is a mouse arrow 144 and/or cursor 146. This is done via the display driver and a mouse and/or keyboard driver (not shown) of the operating system. Moreover, each GUI Web document is interactive in that, when it is displayed, the user can use the mouse 128 and/or keyboard 129 to move the mouse arrow and/or cursor over the displayed GUI Web document and initiate one or more of the specific operations of the GUI on the client computer 102. In other words, each GUI Web document defines one or more of the specific operations of the GUI.

For example, in the case where the GUI defines a word processing application, one of the GUI Web documents 150 may provide operations for inserting, deleting, cutting, and/ or pasting text in a word processing document. Other GUI Web documents could provide operations for spell checking, equation editing, helping, etc.

Like most Web documents, each GUI Web document 150 may include text 152 and non-interactive (non-IA) images 154. Thus, when the GUI Web document is displayed, any text and non-IA images are displayed by the display manager 142 of the Web browser 140 in the conventional way. The text and non-IA images may provide information that characterizes and/or describes the particular GUI operations provided by the GUI Web document.

However, each GUI Web document 150 also includes one or more applets 156 that make it interactive. When the GUI Web document is displayed, the display manager 142 executes each applet. In response, each applet generates a corresponding interactive (IA) image 160 that is displayed by the display manager via the display driver of the operating system 138. When displayed, each IA image enables a user to initiate one of the operations of the GUI each time the user uses the mouse 128 or keyboard 129 in a corresponding way when the displayed mouse arrow 144 or cursor 146 is over the displayed IA image. This invokes the applet that generated the IA image and the applet performs the corresponding operation on the client computer 102 and updates the IA image for display by the display manager.

Thus, in the example where one of the GUI Web documents 150 provides operations for inserting, deleting, cutting, and/or pasting text in a word processing document, this GUI Web document would include an applet 152 which generates an IA image 160 of the word processing document. And, when the IA image is acted on by the user with the mouse 128 and/or keyboard 129, the applet that generates the IA image is invoked so that the user is able to insert, delete, cut, and/or paste text in the word processing document using the mouse and/or keyboard. Additionally, this GUI web document could have a toolbar with operations for selecting fonts and inserting page numbering. The GUI Web document would include an applet which generates an IA image listing the selectable fonts and an applet which generates an IA image providing various page numbering options. Thus, when these IA images are acted on by the user with the mouse 128 and/or keyboard 129, the applets that generates the IA images are invoked so that the user is able to select a font or page numbering option which may then be provided to the main applet generating the IA image of the word processing document for display in the word processing document.

As mentioned earlier, the Web browser 140 is, in the preferred embodiment, a HotJava Web browser or a Java compatible Web browser. Thus, in the preferred embodiment, the applets 156 are Java applets and the display manager 142 of the Web browser includes a Java virtual machine module for verifying, interpreting, and then executing on the client computer 102 the Java applets.

Each GUI Web document 150 is also interactive in that it includes one or more interactive links 158 that are displayed by the display manager 142 when the GUI Web document is displayed. Each link provides a link to a corresponding GUI Web document when it is selected with the mouse 128 when the displayed mouse arrow 144 is moved with the mouse over the link.

When this occurs and the corresponding GUI Web document 150 has already been loaded into the primary memory 134, then the display manager 142 displays it on the display 130 in the manner described earlier. But, if the GUI Web document has not yet been loaded into the primary memory 134, then the load manager 148 does so and the display manager than displays it on the display. As mentioned earlier, the GUI Web document may be loaded from one of the Web sever computers 104 or the secondary memory 133 of the client computer 102 depending on where it is located. Additionally, the initial GUI Web document of the GUI may be loaded, in the manner just described, when the user uses the mouse 128 and/or keyboard 129 and the Web browser's own GUI to specify the URL of the GUI Web document. The Web browser's own GUI is displayed on the display by the display manager.

Thus, in the examples given earlier where the GUI defines a word processing application, the GUI Web document 150 that provides operations for inserting, deleting, cutting, and/or pasting text in a word processing document may have a toolbar with a link 158 to a GUI Web document that provides operations for spell checking. In addition, the toolbar of this GUI Web document could have another link to a GUI Web document that provides operations for equation editing and even another link to a GUI Web document that provides operations and/or text for helping (i.e., explaining to) the user to perform the text inserting, deleting, cutting, and/or pasting operations of the GUI Web document with the link. Similarly, each of the linked GUI Web documents could have similar links to other GUI Web documents.

In this way, all of the GUI Web documents 150 of the GUI are linked together so that a user may move back and forth between them. Thus, when a user wishes to initiate a specific operation of the GUI, the user locates the appropriate GUI Web document defining the operation by using the links of other GUI Web documents. The user then initiates the desired operation in the manner described earlier.

Figure 3:
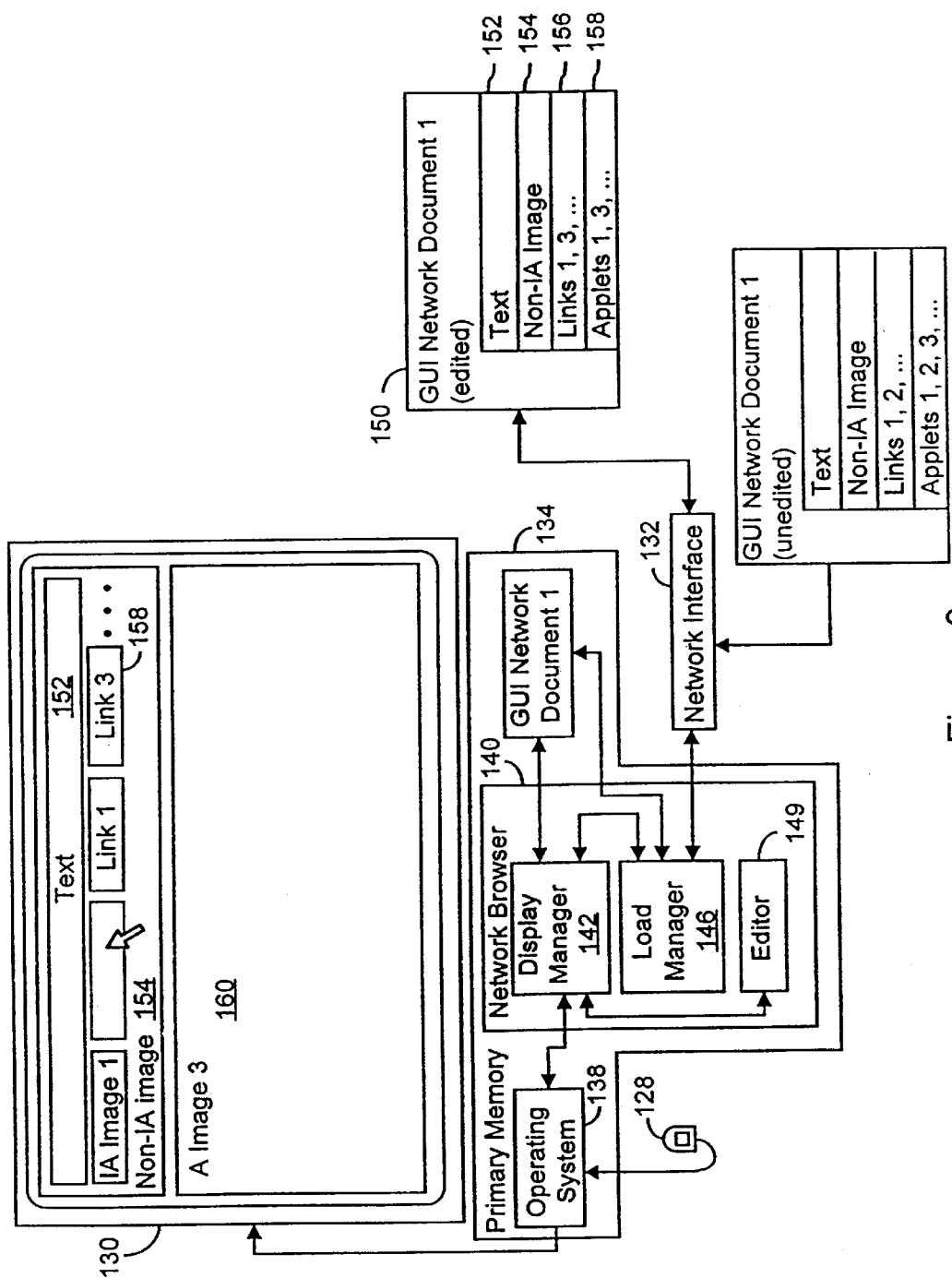
FIG. 3 is a functional block diagram of editing the Web document based GUI.

In view of the foregoing, the GUI Web documents 150 and the Web browser 140 together comprise a GUI that defines an entire application with linked specific operations and additionally may include a linked help system. Moreover, as alluded to earlier and referring to FIG. 3, the GUI can be edited by a user with the editor 149 of the Web browser 140. This is done by editing the GUI Web documents 150.

In order to edit a GUI Web document 150, a user downloads the GUI Web document in the manner described earlier. As was described earlier, this is done with the mouse 128 and/or keyboard 129 by selecting a displayed link 160 in another GUI Web document or specifying its URL address using the Web browser's own displayed GUI.

Then, the user selects with the mouse 128 and/or keyboard 129 the editing mode using the Web browser's own GUI. In response, the display manager 142 invokes the editor 149. The editor enables the user to edit the downloaded GUI Web document by inserting and/or deleting text 152, non-IA images 154, applets 156, and links 158.

After any GUI Web documents 150 are edited, they are then re-located by the load manager at either a pre-existing URL or a new URL. This URL may be either local at the secondary memory 134 or remote at any of the Web sever computers 104, including the same Web server computer at which it may have originally been located.

In this way, a user can customize an already existing GUI by adding and/or removing operations to and/or from certain existing GUI Web documents 150. This is done by adding and/or removing applets 156 from these GUI Web documents and adding and removing links 158 from the GUI Web documents which are linked to the modified GUI Web documents. The removed links may identify the URLs of the original GUI Web documents that were modified while the added links may identify the new URLs of the modified GUI Web documents.

A user could also customize the GUI by adding to it new GUI Web documents 150 that add new operations to the GUI and/or by removing existing GUI Web documents from the GUI so as to remove some of the operations of the GUI. This would be done by adding links 158 to any GUI Web documents which are to be linked to a new GUI Web document and/or removing links from any GUI Web documents which were previously linked to a removed GUI Web document.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A document based GUI (graphical user interface) for use on a client computer that is networked with server computers, the GUI comprising:

GUI documents that collectively enable a user of the client computer to initiate specific operations performed on the client computer and collectively define an entire application executed on the client computer, the GUI documents each being located at the client computer or one of the server computers and including a first GUI document and a second GUI document, the first GUI document including a link that, when displayed and selected, provides a link to the second GUI document, the second GUI document including an applet that (a) when executed, generates a corresponding interactive image, and (b) when the corresponding interactive image is displayed and acted on, is invoked to perform a corresponding one of the specific operations; and a browser that runs on the client computer and that, when the first GUI document is loaded in and displayed on the client computer and the first GUI document's link is displayed on and selected by the user with the client computer, (a) loads, if not already loaded, the second GUI document in the client computer, (b) displays the second GUI document on the client computer by executing the second GUI document's applet on the client computer and displaying the corresponding interactive image on the client computer, and (c) invokes the second GUI document's applet to perform the corresponding specific operation when the user acts on the corresponding interactive image with the client computer.

2. The GUI of claim 1 wherein the GUI documents are HTML documents and the first and second GUI document are located at the sever computers and loaded in the client computer according to the HTTP.

3. The GUI of claim 1 wherein:

the second GUI document's applet is written in a platform independent programming language; and the browser includes a virtual machine module that verifies the integrity of, interprets, and then executes the second GUI document's applet on the client computer when the second GUI document is loaded in the client computer.

4. The GUI of claim 3 wherein the platform independent programming language is the Java programming language and the virtual machine module is a Java virtual machine module.

5. The GUI of claim 1 wherein the browser comprises:

an editor that enables the user to edit a selected one of the GUI documents on the client computer to generate a modified one of the GUI documents;

a load manager that (a) loads the selected GUI document in the client computer for editing by the editor, and (b) locates the modified GUI document at the client computer or one of the server computers so as to replace the selected GUI document.

6. The GUI of claim 5 wherein the editor enables the user to edit the selected GUI document by adding an applet to the selected GUI document that (a) when executed, generates a corresponding interactive image, and (b) when the corresponding interactive image is displayed and acted on, is invoked to perform a corresponding one of the specific operations.

7. The GUI of claim 5 wherein the editor enables the user to edit the selected GUI document by removing an applet from the selected GUI document that (a) when executed, generates a corresponding interactive image, and (b) when the corresponding interactive image is displayed and acted on, is invoked to perform a corresponding one of the specific operations.

8. The GUI of claim 5 wherein the editor enables the user to edit the selected GUI document by adding a link to the selected GUI document that, when displayed and selected, provides a link to one of the GUI documents.

9. The GUI of claim 5 wherein the editor enables the user to edit the selected GUI document by removing a link from the selected GUI document that, when displayed and selected, provides a link to one of the GUI documents.

10. A method of providing a document based GUI (graphical user interface) for use on a client computer that is networked with server computers, the method comprising the steps of:

providing GUI documents that collectively enable a user of the client computer to initiate specific operations which are performed on the client computer and collectively define an entire application which is executed on the client computer, the GUI documents each being located at the client computer or one of the server computers and including a first GUI document and a second GUI document, the first GUI document including a link that, when displayed and selected, provides a link to the second GUI document, the second GUI document including an applet that (a) when executed, generates a corresponding interactive image, and (b) when the corresponding interactive image is displayed and acted on, is invoked to perform a corresponding one of the specific operations; and when the first GUI document is loaded in and displayed on the client computer and the first GUI document's link is displayed on and selected by the user with the client computer, loading, if not already loaded, the second GUI document in the client computer;

displaying the second GUI document on the client computer by executing the second GUI document's applet on the client computer and displaying the corresponding interactive image on the client computer; and invoking the second GUI document's applet to perform the corresponding specific operation when the user acts on the corresponding interactive image with the client computer.

11. The method of claim 10 wherein the GUI documents are HTML documents and the first and second GUI documents are located at the sever computers and loaded in the client computer according to the HTTP.

12. The method of claim 10 wherein:

the second GUI document's applet is written in a platform independent programming language; and the executing step includes verifying the integrity of, interpreting, and then executing the second GUI documents applet on the client computer with a virtual machine module when the second GUI document is loaded in the client computer.

13. The method of claim 12 wherein the platform independent programming language is the Java programming language and the virtual machine module is a Java virtual machine module.

14. The method of claim 10 further comprising the steps of:

enabling the user to edit a selected one of the GUI documents on the client computer to generate a modified one of the GUI documents;

loading the selected GUI document in the client computer; and locating the modified GUI document at the client computer or one of the server computers so as to replace the selected GUI document.

15. The method of claim 14 wherein the enabling step includes enabling the user to edit the selected GUI document by adding an applet to the selected GUI document that (a) when executed, generates a corresponding interactive image, and (b) when the corresponding interactive image is displayed and acted on, is invoked to perform a corresponding one of the specific operations.

16. The method of claim 14 wherein the enabling step includes enabling the user to edit the selected GUI document by removing an applet from the selected GUI document that (a) when executed, generates a corresponding interactive image, and (b) when the corresponding interactive image is displayed and acted on, is invoked to perform a corresponding one of the specific operations.

17. The method of claim 14 wherein the enabling step includes enabling the user to edit the selected GUI document by adding a link to the selected GUI document that, when displayed and selected, provides a link to one of the GUI documents.

18. The method of claim 14 wherein the enabling step includes enabling the user to edit the selected GUI document by removing a link from the selected GUI document that, when displayed and selected, provides a link to one of the GUI documents.

19. In a computer network including server computers and a client computer that is networked with the server computers, computer data signals embodied in carrier waves that provide a document based GUI (graphical user interface) for use on the client computer, the computer data signals comprising:

GUI documents that collectively enable a user of the client computer to initiate specific operations performed on the client computer and collectively define an entire application executed on the client computer, the GUI documents each being located at the client computer or one of the server computers and including a first GUI document and a second GUI document, the first GUI document including a link that, when displayed and selected, provides a link to the second GUI document, the second GUI document including an applet that (a) when executed, generates a corresponding interactive image, and (b) when the corresponding interactive image is displayed and acted on, is invoked to perform a corresponding one of the specific operations; and a browser that runs on the client computer and that, when the first GUI document is loaded in and displayed on the client computer and the first GUI document's link is displayed on and selected by the user with the client computer, (a) loads, if not already loaded, the second GUI document in the client computer, (b) displays the second GUI document on the client computer by executing the second GUI document's applet on the client computer and displaying the corresponding interactive image on the client computer, and (c) invokes the second GUI document's applet to perform the corresponding specific operation when the user acts on the corresponding interactive image with the client computer.

20. The computer data signals of claim 19 wherein the GUI documents are HTML documents and the first and second GUI document are located at the sever computers and loaded in the client computer according to the HTTP.

21. The computer data signals of claim 19 wherein:

the second GUI document's applet is written in a platform independent programming language; and the browser includes a virtual machine module that verifies the integrity of, interprets, and then executes the second GUI document's applet on the client computer when the second GUI document is loaded in the client computer.

22. The computer data signals of claim 21 wherein the platform independent programming language is the Java programming language and the virtual machine module is a Java virtual machine module.

23. The computer data signals of claim 19 wherein the browser comprises:

an editor that enables the user to edit a selected one of the GUI documents on the client computer to generate a modified one of the GUI documents;

a load manager that (a) loads the selected GUI document in the client computer for editing by the editor, and (b) locates the modified GUI document at the client computer or one of the server computers so as to replace the selected GUI document.

24. The computer data signals of claim 23 wherein the editor enables the user to edit the selected GUI document by adding an applet to the selected GUI document that (a) when executed, generates a corresponding interactive image, and (b) when the corresponding interactive image is displayed and acted on, is invoked to perform a corresponding one of the specific operations.

25. The computer data signals of claim 23 wherein the editor enables the user to edit the selected GUI document by removing an applet from the selected GUI document that (a) when executed, generates a corresponding interactive image, and (b) when the corresponding interactive image is displayed and acted on, is invoked to perform a corresponding one of the specific operations.

26. The computer data signals of claim 23 wherein the editor enables the user to edit the selected GUI document by adding a link to the selected GUI document that, when displayed and selected, provides a link to one of the GUI documents.

27. The computer data signals of claim 23 wherein the editor enables the user to edit the selected GUI document by removing a link from the selected GUI document that, when displayed and selected, provides a link to one of the GUI documents.

* * * * *